United States Patent [19]
Lloyd

[11] Patent Number: 5,037,264
[45] Date of Patent: Aug. 6, 1991

[54] HYDRAULICALLY OPERATED LOAD HANDLING VEHICLE FOR OPEN-TOP RAILWAY CARS

[76] Inventor: Claud A. Lloyd, 4818 Hendricks Ave., Terre Haute, Ind. 47805

[21] Appl. No.: 511,453

[22] Filed: Apr. 23, 1990

[51] Int. Cl.5 .......... B65G 67/00
[52] U.S. Cl. .......... 414/339; 180/8.6; 180/8.1; 104/137; 414/695.5
[58] Field of Search .......... 414/339, 340, 348, 750, 414/695.5, 694; 180/906, 8.5, 8.6, 8.1; 901/1; 104/2, 4, 137

[56] References Cited

U.S. PATENT DOCUMENTS

| | | | |
|---|---|---|---|
| 3,842,926 | 10/1974 | Williams et al. | 180/4.1 X |
| 3,933,218 | 1/1976 | Oler et al. | |
| 4,096,954 | 6/1978 | Buckner | 414/339 |
| 4,099,635 | 7/1978 | Leonard et al. | 414/339 X |
| 4,213,726 | 7/1980 | Robnett et al. | 414/420 |
| 4,270,456 | 6/1981 | Theurer et al. | 414/342 X |
| 4,483,407 | 11/1984 | Iwamoto et al. | 180/9.5 |
| 4,551,059 | 11/1985 | Petoia | 414/459 |
| 4,566,389 | 1/1986 | Theurer et al. | 414/459 X |
| 4,723,886 | 2/1988 | Frederking | 414/339 |
| 4,779,691 | 10/1988 | Werdner | 180/8.6 X |

FOREIGN PATENT DOCUMENTS

| | | | |
|---|---|---|---|
| 1455658 | 12/1968 | Fed. Rep. of Germany | 180/8.6 |
| 26174 | 2/1987 | Japan | 180/8.1 |
| 203483 | 8/1988 | Japan | 180/8.7 |

OTHER PUBLICATIONS

Photos of "Jimbo" Load handling apparatus made by Temco.

*Primary Examiner*—Frank E. Werner
*Attorney, Agent, or Firm*—H. John Barnett

[57] ABSTRACT

A hydraulically operated load handling vehicle for open-top railway cars having four, three-way adjustable outriggers, each having a pair of wheel-like pads which ride along the sidewall tops of open-top railway cars. The corresponding wheel-like pads on the vehicle can be raised and lowered separately from the other corresponding pair so as to move across the space between adjacent railway cars in a string by a bridging action. The vehicle is provided with at least one crane, and preferably two cranes to load and unload the railway cars on which it is supported.

7 Claims, 2 Drawing Sheets

HYDRAULICALLY OPERATED LOAD HANDLING VEHICLE FOR OPEN-TOP RAILWAY CARS

BACKGROUND OF THE INVENTION

This invention relates to load handling vehicles for open-top railway cars and, more particularly, to a hydraulically operated load handling vehicle which is provided with four, three-way adjustable outriggers. Each outrigger has a pair of wheel-like pads which are adapted to ride along the tops of the sidewalls of a string of open-top railway cars. The corresponding pairs of wheel-like pads on one end of the vehicle can be raised or lowered separately from the other corresponding pair so as to move across the space between adjacent railway cars in a string by a bridging action.

Railway Products Division of TEMCO makes a "JIMBO," which is a large apparatus having two relatively movable frame members supported on hydraulic lifters. Transfer between cars cannot be accomplished safely on a curved track section because the longer frame member will not line up with the next car in the string. It is necessary for the small frame member supporting the cab to lift the long frame member and extend it to the next car in the string, a cumbersome procedure.

Various types of load handling devices are described in the following U.S. Patents:

| U.S. Pat. No. | Date |
|---|---|
| 3,933,218 | 1976 |
| 4,213,726 | 1980 |
| 4,270,456 | 1981 |
| 4,483,407 | 1984 |
| 4,551,059 | 1985 |
| 4,566,389 | 1986 |

U.S. Pat. No. 3,933,318 describes a truck having height adjustable, telescopic legs, but it appears that the legs can be adjusted vertically, but not laterally. The apparatus is especially intended for handling large shipping containers, either on board ship or on wharfs. The chassis frame of this apparatus comprises at least two frame members that can be displaced relative to one another to change the length of the truck. Each leg of the truck is fitted with an independently movable wheel and each leg telescopes to change the height of the cross beams 13 and 14.

U.S. Pat. No. 4,213,726 is directed to a container carrier vehicle which has a hydraulically operated load handling means. A pulling tractor is required for this vehicle. It will operate only on a substantially level surface, and it is not adapted to traverse gaps in a support surface.

U.S. Pat. Nos. 4,270,456 and 4,566,389 issued to Theurer et al, pertain to track laying apparatus. The older patent (issued June 2, 1981) describes a track laying apparatus which comprises a succession of transport vehicles coupled together, and an elongated overhead girder extending in a plane over the transport vehicles and suspended from a girder carrier arm which extends over the transport vehicles. A second girder carrier arm extends beyond the foremost transport vehicle. The free ends of the girder carrier arms are equipped with two laterally pivotal and vertically adjustable supports. The apparatus rides directly on the track section being repaired. The more recent of Theurer et al's patents (1986) includes "bogies" 14 for positioning and supporting the new rail section 11 over the road bed. The "bogies" 14 can be raised and lowered, and laterally adjusted, but they are intended only to support a new track section or switch 11 over a roadbed on which it is to be laid. The wheels 34, 37 of transport vehicles 3 are adapted only to ride on track 8 or 11.

U.S. Pat. No. 4,483,407 is directed to an endless track vehicle having relatively movable drive wheels to vary the configuration of the endless track so that the vehicle can go up and down stairs. The vehicle includes a manipulator arm and a television camera so that it can be remotely controlled. U.S. Pat. No. 4,551,059 is directed to a multi-directional straddle-lift carrier particularly designed for handling heavy missiles on board ships having narrow passageways. This carrier is not designed to cross over gaps in a support surface, since there is no means to lift any of the support means above the others to traverse a gap such as that between two open-top freight cars.

SUMMARY OF THE INVENTION

This invention is directed a versatile load handling vehicle for open-top railway cars which has four, three-way adjustable supporting outriggers. Each outrigger has a pair of wheel-like pads which can be independently raised and lowered to engage a support surface such as the top surface of the sidewalls of open-top railway cars. The corresponding pairs of wheel-like pads on one end of the vehicle can be raised and lowered separately from the other corresponding pair to facilitate movement of the vehicle across the space between adjacent railway cars in a string by a bridging action.

The supports for the wheel-like pads include means to adjust the lateral distance between each pair of outriggers so that the vehicle can be used on car strings of different widths. If the variation in width between successive cars in a string is about one foot, the width of the wheel-like pads is sufficient to allow transfer from a narrow to a wider car, or the reverse.

After the leading supports for the four leading wheel-like pads have come to rest on the sidewalls of a wider car, the lateral distance between the outrigger supports is increased until the flanges of the wheel-like pads contact the inner surface of the respective car sidewalls.

In situations where the difference in width between adjacent cars is greater that about one foot, the leading end of the vehicle can be supported on the four following wheel-like pads and the leading load handling crane while the four leading wheel-like pads are suspended and moved above the next car, and the lateral width between the suspended wheel-like pads adjusted to the width of the sidewalls of the freight car to which the vehicle is being transferred. To transfer the following wheel-like pads to the same car, the vehicle is supported by the leading wheel-like pads and following load handling crane while the four following wheel-like pads are suspended and moved over the next car, and the lateral width between the four following wheel-like pads adjusted to the width of the sidewalls as was done above with the leading wheel-like pads. The following wheel-like pads are then lowered to rest on the respective sidewalls of the freight car to complete the transfer.

The load handling vehicle of the invention provides a very stable working platform for the cranes mounted on it, so the cranes can load or unload a string of freight cars efficiently and safely. The load handling vehicle is capable of moving from car to car in a string with relatively little delay, even when the successive cars are of different width.

Figure 1:
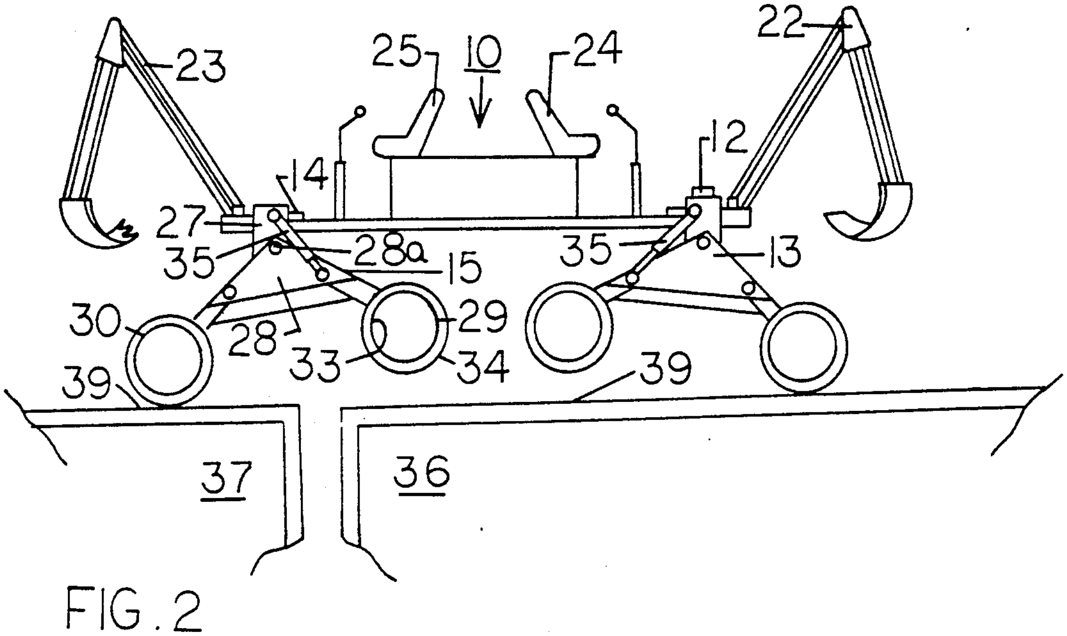
FIG. 1 of the drawings is a schematic side elevational view of the load handling vehicle of the invention midway its transfer from one car to a second car.

As shown in the drawings, a load handling vehicle 10 comprises a main, rectangular frame 11 which supports four, three-way adjustable outriggers 12, 13, 14 and 15. Each outrigger 12–15 is substantially similar to the others, and outriggers 12 and 14 are substantially identical and interchangeable. Outriggers 13 and 15 are also substantially identical and interchangeable, also.

Figure 2:
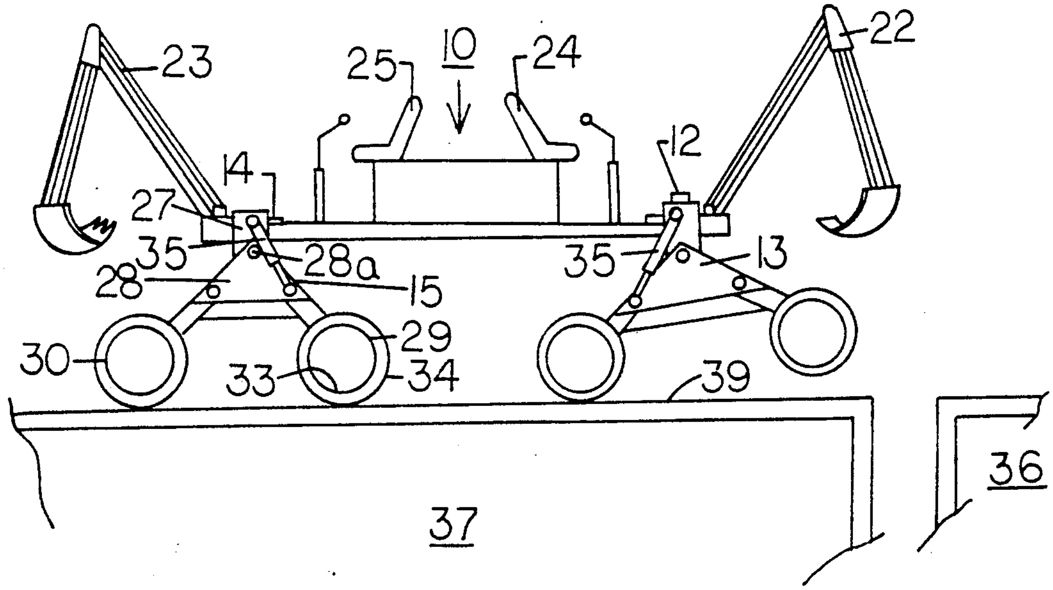
FIG. 2 is a side elevation of the load vehicle shown in FIG. 1 to show the independent control capability of the wheel-like pads.
Figure 3:
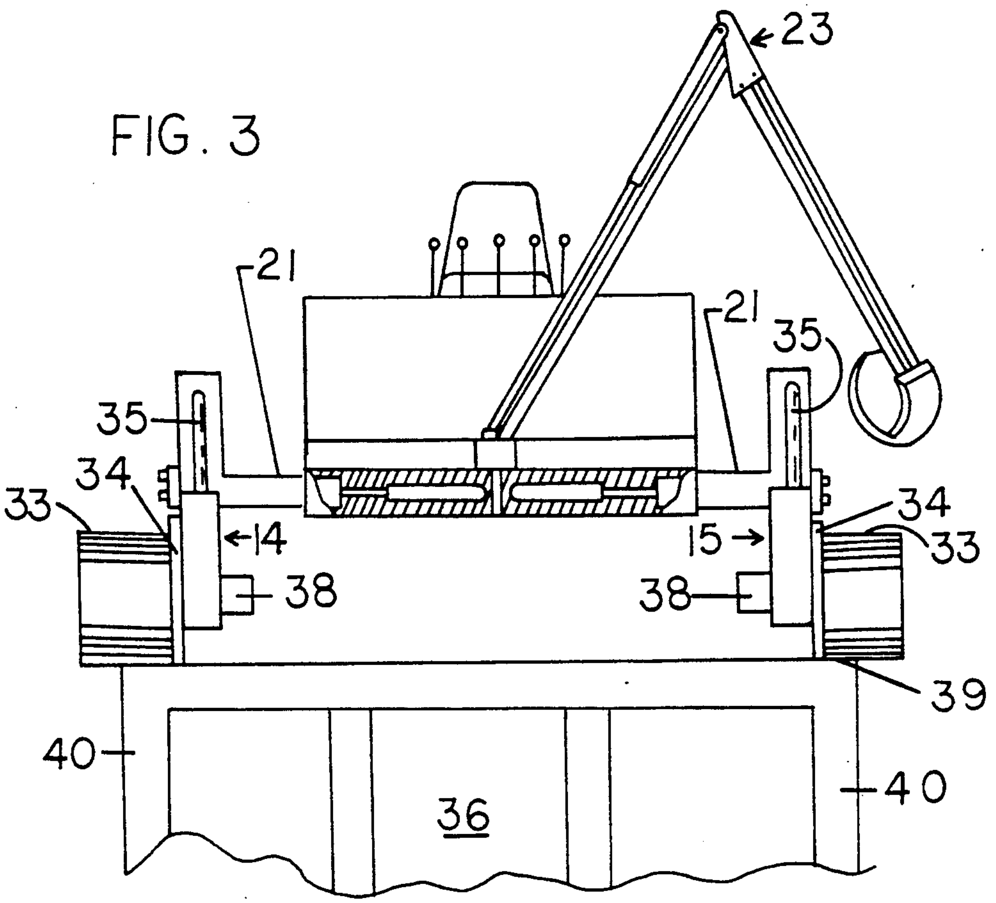
FIG. 3 is a schematic, rear elevational view of the load handling vehicle with some parts broken away showing the wheel-like pads supported on the top of the sidewalls of an open-top railway car.

As best seen in FIG. 2, the front, transverse member 16 and the rear, transverse member 17 of the frame 11 are reinforced tubular members, in which transverse beams 18, 19, 20 and 21 of the outriggers 12, 13, 14, and 15, respectively, are inserted to support the frame on the outriggers 12–15. Frame 11 is provided with a front load handling crane 22 and a substantially identical rear load handling crane 23. Cranes 22 and 23 are provided with operator seats 24 and 25, respectively and the required hydraulic controls (not shown) for operating all the moving parts of the vehicle.

Each outrigger 12–15 is so similar in construction that a description of one will suffice for a full understanding of their components and functions. Outrigger 15 comprises the transverse beam 21 which moves laterally in and out of the rear transverse member 17. The outer end 26 of transverse beam 21 terminates in a mounting bracket 27. A rocker arm 28 is pivotally connected at its midpoint 28*a* to its corresponding mounting bracket 27. Wheel-like pads 29 and 30 are rotatably mounted on the front and rear ends of the rocker arm 28 respectively, on associated stub axles 31 and 32. The wheel-like pads 29 and 30 each include a relatively wide cylindrical portion 33 and an inner flange 34. Hydraulic cylinder assembly 35 is connected at its upper end to mounting bracket 27 and at its lower end to the front end of the rocker arm 28.

Extension of hydraulic cylinder assembly 35 causes the front end of rocker arm 28 to be lowered and the rear end of rocker arm 28 to be raised, thereby raising the rear wheel-like pad 30, and lowering wheel-like pad 29. Contraction of hydraulic cylinder assembly 35 has the opposite effect. All four outriggers 12–15 may be operated in a similar manner, and the movements coordinated by the vehicle operator so that the rear wheel-like pads 30 on opposite sides of the vehicle may be raised or lowered together. The positioning of the rear outriggers 14 and 15 and their wheel-like pads may be coordinated with the position of the front outriggers 12 and 13 to transfer the load handling vehicle from one freight car 36 to a next freight car 37 in a string as best seen in FIG. 1.

Each wheel-like pad 29, 30 is provided with an electric motor drive means 38. Each wheel-like pad 29, 30 can be rotated in either direction, as desired, to cause the coordinated, horizontal movement of the load handling vehicle 10 along the tops 39 of the sidewalls 40 of the freight cars 36 and 37 in a forward or rearward direction with respect to the string of railway cars.

Figure 4:
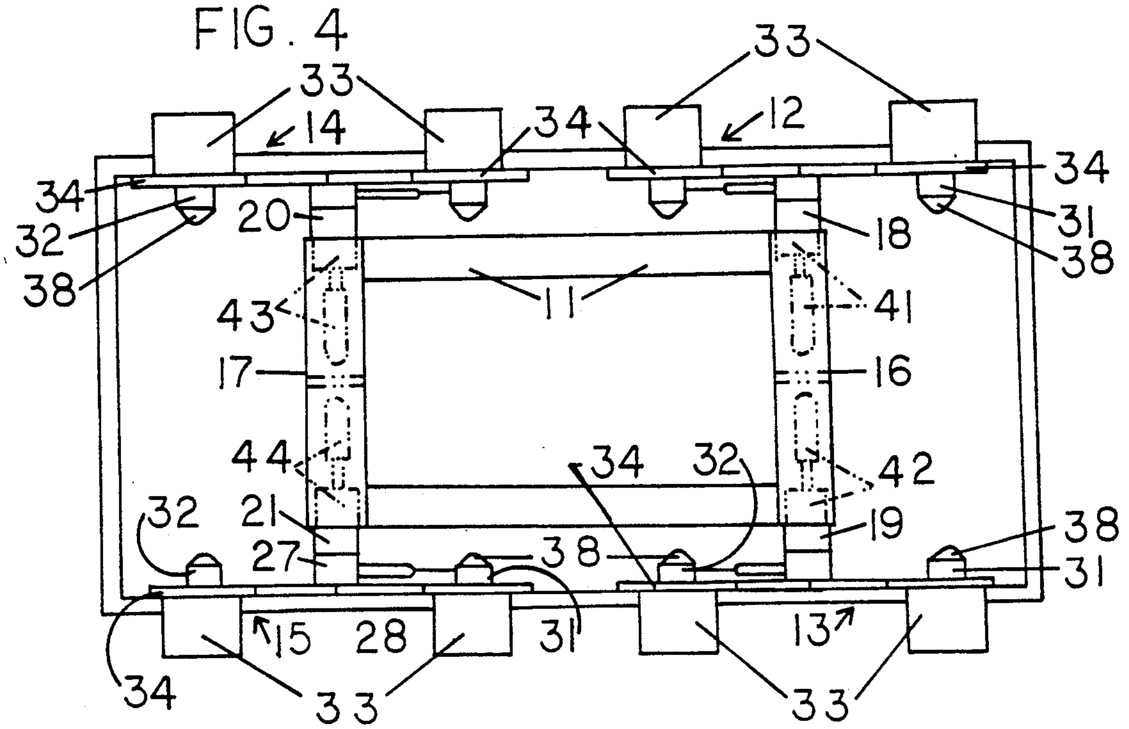
FIG. 4 is a schematic top plan view with some parts omitted and some parts shown in phantom to illustrate the lateral adjustment system for the wheel-like pads.

The load handling cranes 22 and 23 are hydraulically operated in a conventional manner (not shown). Hydraulic drive assemblies 41 and 42 are disposed in the front transverse member 16, as best seen in FIG. 4 and can be operated independently. Hydraulic drive assembly 41 is connected with transverse beam 18 to move it laterally outwardly or inwardly, depending on the signal sent to the hydraulic drive assembly 41 by the vehicle operator. Transverse beam 19 is operated independently as described above for transverse beam 18 by hydraulic drive assembly 42.

Hydraulic drive assemblies 43 and 44 are disposed in the rear transverse member 17. Hydraulic drive assembly 43 is connected to the transverse beam 20 to move transverse beam 20 laterally inwardly and outwardly in response to the vehicle operator's signal. Hydraulic drive assembly 44 is connected to transverse beam 21 to move it laterally inwardly or outwardly on signal, also. Each of the four transverse beam members 18–21 may be operated independently of the others.

The hydraulic control system is determined by the independent control of each outrigger and wheel assembly and is not shown. Its detailed construction is dictated by the particular motions described above, and is believed to be within the usual design parameters apparent to those skilled in the art.

Although two control operator positions are shown, one can be limited to control of the associated load handling crane and the other may carry all the outrigger controls as well as the controls for rotating the wheel-like pads to move the vehicle along the tops of the string of railway cars. All the vehicle crane and outrigger controls may be placed at a single control operator's station. Although two load handling cranes are shown, it is contemplated that one load handling means may be adequate in certain applications.

The most important feature of the invention is provision of a stable, mobile vehicle for load handling cranes which can easily move along the tops of open- topped freight cars to load or unload them. The vehicle can easily bridge the gap between successive cars in the string because of its unique and highly adjustable outrigger assemblies which operate the wheel-like pads of the vehicle which ride on the tops of the freight car sidewalls.

What is claimed is:

1. A hydraulically operated load handling vehicle for loading and unloading open-top railway cars with sidewalls having upper edges, said vehicle being movable along a string of cars of the same or different widths and comprising:

a pair of generally horizontal, parallel side frame members, each having first and second ends;

a first, transverse tubular member extending between, and secured to, the first ends of the side frame members, said first tubular member being open at both ends;

a second, transverse tubular member extending between, and secured to, the second ends of the side frame members, said second tubular member being open at both ends;

a plurality of outrigger assemblies, each including a transverse beam member slidably supported in a corresponding open end of the first and second transverse tubular members, a rocker arm support member connected to the outer end of the transverse beam member, a rocker arm having downwardly extending first and second ends pivotally connected at a substantial midpoint thereof to the rocker arm support member and a pair of wheel-like pads rotatably mounted on the first and second ends of the rocker arms, respectively, said wheel-like pads being sufficiently wide to support said vehicle on the upper edges of the sidewalls of open-top railway cars of the same or different widths;

a plurality of hydraulic cylinder assemblies horizontally disposed in the first and second tubular members adapted to slide the corresponding transverse beam member and its associated outrigger assembly in or out of the corresponding tubular member to increase or decrease the distance between transversely opposite outrigger assemblies to position the corresponding wheel-like pads on the upper edges of the sidewalls of an open-top railway cars;

a second plurality of hydraulic cylinder assemblies, each interconnecting one end of each rocker arm to the corresponding rocker arm support members to allow pivoting action of the rocker arm support member to allow pivoting action of the rocker arm, thereby raising or lowering a pair of wheel-like pads to facilitate transfer of said vehicle along the upper edges from one open-top railway car to another, including railway cars of different widths.

2. The load handling vehicle of claim 1, including a boom structure supported by the vehicle, said structure including grasping means to grasp and load materials into, or out of, the string of railway cars on which it is supported.

3. The load handling vehicle of claim 2, in which the boom structure comprises a hydraulically operated crane assembly to grasp and load materials into, or out of, the string of railway cars upon which it is supported.

4. The load handling vehicle of claim 1, in which each wheel-like pad includes a relatively wide cylindrical portion and a relatively wide cylindrical portion and a flange portion for supporting the vehicle on the upper edges of the sidewalls of open-top railway cars of the same and different widths.

5. The load handling vehicle of claim 4, including an electric motor drive means with each wheel-like pad to move along a string of open-top railway cars.

6. The load handling vehicle of claim 5, including hydraulic control means for independently operating the hydraulic cylinder assembly associated with each rocker arm to raise and lower each wheel-like pad independently to facilitate transfer of the vehicle from one railway car to the next one in a string of railway cars.

7. The load handling vehicle of claim 6, including hydraulic control means for independently operating any of the hydraulic cylinder assemblies disposed in the respective transverse tubular member to move the corresponding outrigger assembly inwardly or outwardly to facilitate transfer of the vehicle to a railway car of different width.

* * * * *